United States Patent [19]

Brown et al.

[11] 4,300,872

[45] Nov. 17, 1981

[54] OUTBOARD MOTOR WITH HYDRAULIC PUMP AND MEANS FOR ATTACHING HYDRAULIC PUMP TO SUCH A MOTOR

[76] Inventors: Peter S. Brown, R.F.D. 2, Warren, Me. 04864; Samuel H. Tibbetts, P.O. Box 82, Rockport, Me. 04856

[21] Appl. No.: 113,737

[22] Filed: Jan. 21, 1980

Related U.S. Application Data

[63] Continuation of Ser. No. 861,684, Dec. 19, 1977, abandoned, which is a continuation-in-part of Ser. No. 740,885, Nov. 11, 1976, abandoned.

[51] Int. Cl.³ .............................................. F04B 39/14
[52] U.S. Cl. ..................... 417/360; 417/364; 123/195 P; 123/198 C; 440/76; 440/900
[58] Field of Search ................ 417/313, 360, 364; 115/17; 74/15.63; 123/198 C, 195 R; 440/900, 113, 49, 76

[56] References Cited

U.S. PATENT DOCUMENTS

| | | | |
|---|---|---|---|
| 2,496,434 | 2/1950 | Bosma | 115/17 UX |
| 2,684,635 | 7/1954 | Winkelman et al. | 115/17 |
| 3,470,600 | 10/1968 | Meyer | 115/17 X |
| 3,643,642 | 2/1972 | Junes | 123/198 C |
| 3,927,954 | 12/1975 | Walker | 417/364 X |

*Primary Examiner*—Richard E. Gluck

[57] ABSTRACT

An attachment by which a hydraulic pump is to be driven by an outboard motor has a coupling by which the pump shaft is or can be connected to the support established by the fly wheel of the motor or the fly wheel and the upper end of the crankshaft with the weight of the attached pump transmitted to the support. The attachment also includes torque opposing and pump stabilizing means by which the pump is or may be attached to the motor laterally of the fly wheel. In one embodiment of the invention, misalignment forces are accommodated solely by the torque opposing means and in another embodiment the coupling is flexible.

13 Claims, 7 Drawing Figures

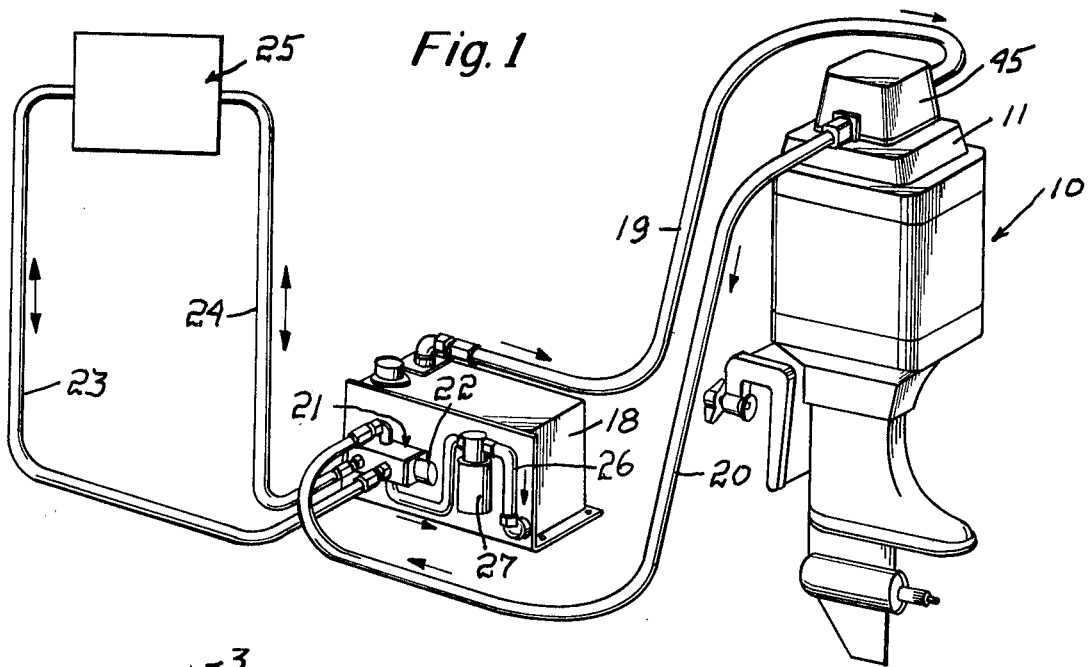
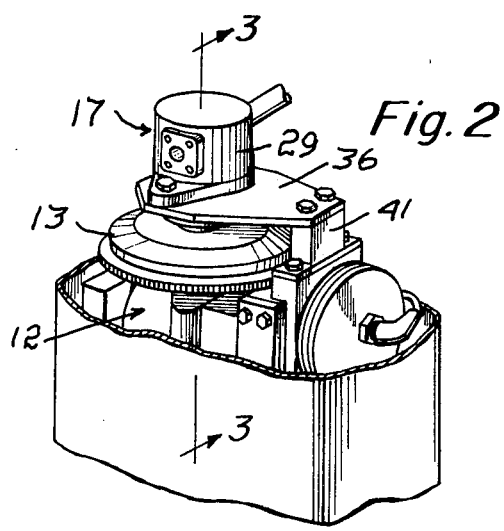
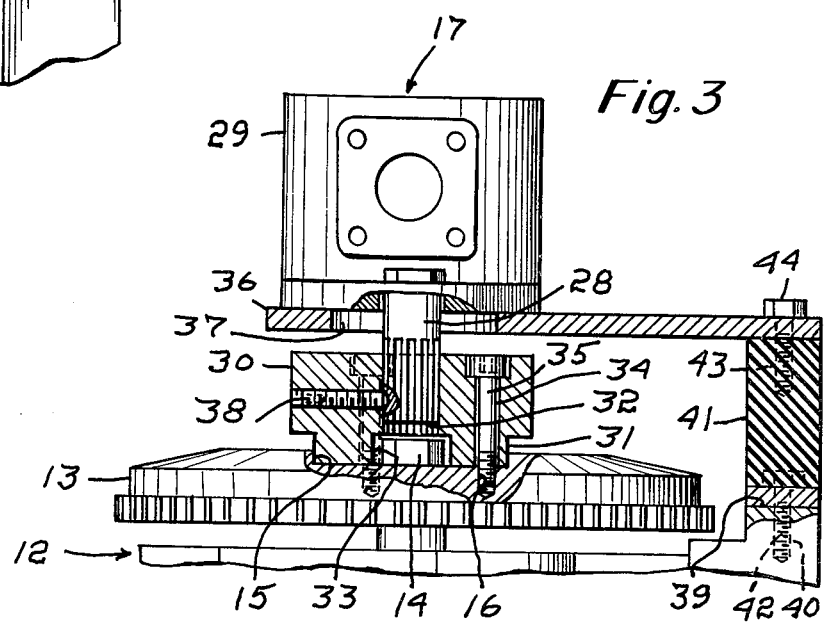

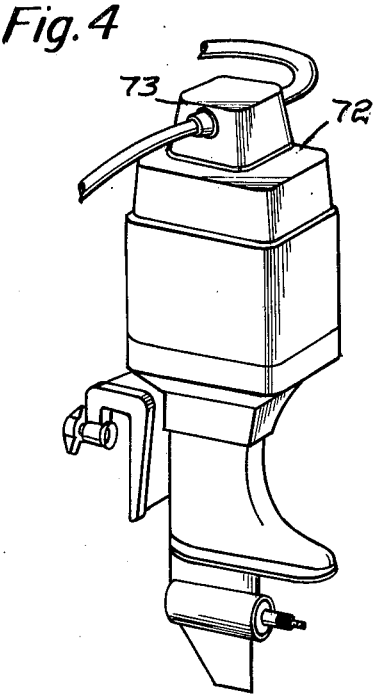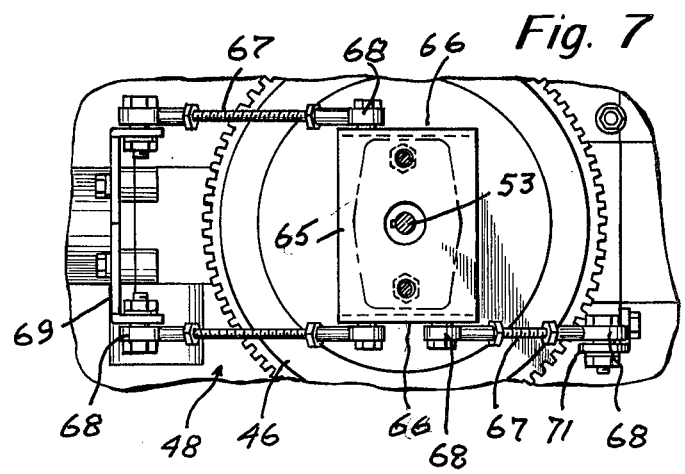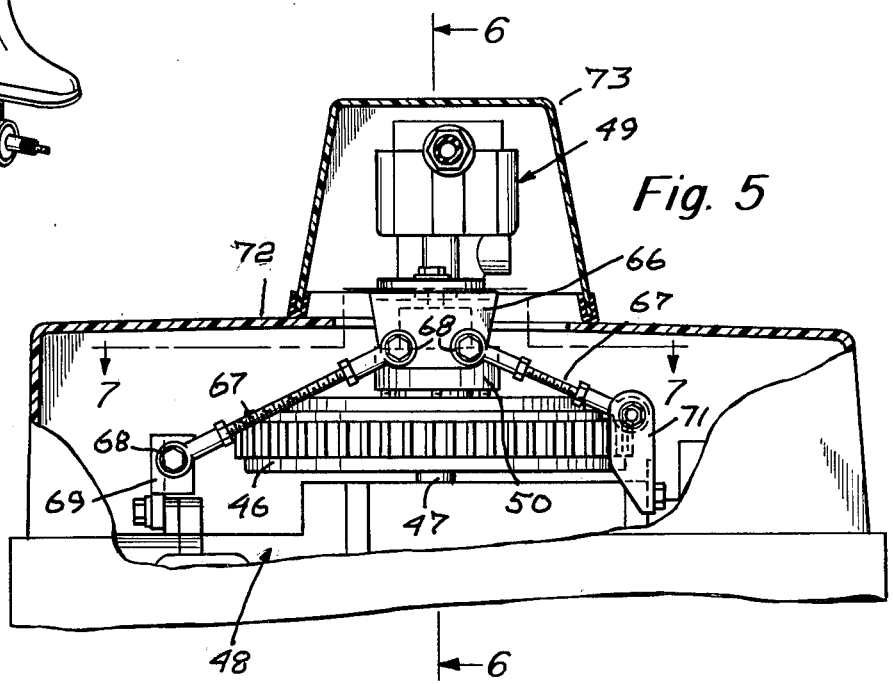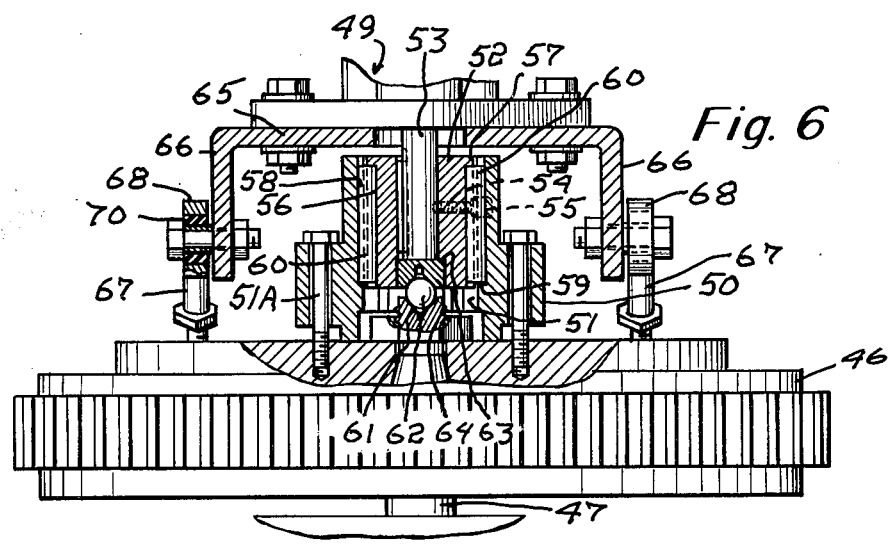

OUTBOARD MOTOR WITH HYDRAULIC PUMP AND MEANS FOR ATTACHING HYDRAULIC PUMP TO SUCH A MOTOR

This is a continuation of application Ser. No. 861,684, filed Dec. 19, 1977, now abandoned, which is a continuation-in-part of Ser. No. 740,885, filed Nov. 11, 1976, and now abandoned.

RELATED APPLICATION

An application of Peter S. Brown and Samuel H. Tibbetts Ser. No. 861,683, filed Dec. 19, 1977, now abandoned.

BACKGROUND REFERENCES

United States Letters Patent No. 2,496,434
United States Letters Patent No. 2,684,635
United States Letters Patent No. 3,407,600
United States Letters Patent No. 3,643,642
United States Letters Patent No. 3,927,954

BACKGROUND OF THE INVENTION

As outboard motors or engines are not provided with a power take-off, boats equipped with such motors are at a disadvantage when compared with boats that have inboard engines since the latter commonly have power take-offs. As a consequence, boats powered by outboard motors cannot use hydraulically operated devices such, for example, as trap and seine haulers since such motors have no means to operate a hydraulic pump.

This disadvantage has been recognized and proposals have been made to attach the drive shaft of a hydraulic pump to the fly wheel end of the drive shaft of the outboard by means of a flexible coupling with the pump housing suitably anchored. As far as we are aware, however, such proposals have not been well received because of difficulty in effecting a satisfactory connection between the shafts.

THE PRESENT INVENTION

The general objectives of the present invention are to provide outboard motors with hydraulic pumps and to provide means enabling such pumps to be attached to the engines thereof with maximum ease and convenience and ensure efficient pump operation with accommodation of misalignment forces.

In accordance with the invention, these objectives are attained with the fly wheel, or the flywheel and the crankshaft of an outboard motor constituting a support by which a hydraulic pump can be driven. Each pump attachment includes a coupling by which the pump shaft is or may be connected to the support and driven thereby with the weight of the attached pump transmitted to the support. Each attachment also includes resiliently yieldable torque opposing and pump stabilizing means by which a coupled pump may be attached to the motor laterally of its fly wheel.

Another objective of the invention is to provide a coupling in which the torque opposing means accommodate the misalignment forces, an objective attained with the coupling a hub secured to the fly wheel in which the end of the pump shaft is splined and locked thereto and with at least one torque opposing arm secured to the pump and the engine with the connection including a resilient mount.

Another objective of the invention is to provide a coupling that is flexible and capable of accommodating the misalignment forces, an objective attained with the coupling having a drive member fixed on the fly wheel, a driven member locked to the pump shaft and extending through the drive member, a supporting ball joint between the driven member and the upper end of the crankshaft, and a driving connection between the members capable of accommodating misalignment forces.

Another objective of the invention is to provide couplings that also absorb shock, an objective attained with the driving connection elastomeric splines and desirably the driven member is a free fit within the drive member with the splines also serving to resist torque up to a predetermined maximum.

A further objective of the invention is to ensure pump stability where a flexible coupling is used, an objective attained with the torque opposing means a series of at least three arms connected to or connectable to the motor at three appropriately spaced points, the arms preferably of the type having, at least one end provided with a bolt receiving eye having an elastomerid lining.

Other objectives of the invention will be apparent from the description of its preferred embodiment and the appended claims.

BRIEF DESCRIPTION OF THE DRAWINGS

Preferred embodiments of the invention are illustrated by the accompanying drawings of which FIG. 1 is a perspective view of an outboard engine or motor with a hydraulic device operating system, the pump of which is driven by the outboard engine;

FIG. 2 is a fragmentary perspective view of the motor;

FIG. 3 is a section taken approximately along the indicated line 3—3 of FIG. 2;

FIG. 4 is a side elevation of a pump equipped motor in accordance with another embodiment of the invention;

FIG. 5 is a fragmentary partially broken away side view thereof;

FIG. 6 is a section taken approximately along the indicated line 6—6 of FIG. 5; and FIG. 7 is a section taken approximately along the indicated line 7—7 of FIG. 5.

THE PREFERRED EMBODIMENT OF THE INVENTION

A typical outboard engine or motor having a horse power rating adequate for use by commercial fishermen is generally indicated at 10 in FIG. 1. The casing of such a motor includes an upper portion 11 which, when removed exposes the engine 12, and its fly wheel 13. The nut 14 by which the fly wheel 13 is secured to the upper end of the engine crankshaft is partly within a coaxial cylindrical recess or seat 14 within which are screw holes 16 by which a fly wheel attachment or pulley may be secured.

Hydraulic systems suitable for installation on small boats are, of course, well known. Such systems include a hydraulic pump 17, an oil chamber 18 having a hose 19 placing it in communication with the intake side of the pump 17. A hose 20 connects the discharge of its pump 17 to the four-way valve 21 having an actuator 22 by which the direction of flow through the hose lines 23 and 24 to and from the device controlling its operation in the desired manner. Such a device is indicated schematically at 25 and it may, for examples, be a pot or seine hauler, a gil net reel, a deck winch, or a power boom. The valve is also provided with a return hose 26 connected to the chamber 18 through an oil filter 27. Thus, with the pump 17 in use, oil circulates through the valve 21 or if the valve is set to operate the device 25 in one direction or the other, the circulation is through the hose lines 23 and 24 in the appropriate direction and through the return line 26.

In order to utilize the engine 12 to drive the pump 17, the pump 17 must be mounted with its drive shaft 28 connected to the fly wheel and its casing 29 secured and in accordance with the invention, attachments are provided to enable such an installation to be effected.

The attachment illustrated by FIGS. 1–3 includes a coupling in the form of a hub member 30 having a cylindrical boss 31 concentric with an axial bore 32 extending downwardly therethrough with its lower end counterbored as at 33 to fit over the nut 14. The boss 31 is dimensioned to be a precision fit in the recess 15 and the hub 30 has bores 34 receiving screws 35 which, when threaded into the screw holes 16, enable the hub 30 to be clamped to the fly wheel 13. It will be noted that the bores 34 are oversized so that the screws 35, while a loose fit therein, serve to clamp the hub 30 in place and permit the accurate centering of the hub to ensure that the axis of its bore 32 is in vertical alignment with the axis of the crankshaft without requiring that the screw holes be precisely located but rather depending on the fit of the boss 31 in the cylindrical recess 15 which serves as a positive centering seat therefor. Thus, if the fly wheel is not made with such a seat, it has such a cylindrical seat machined therein.

The pump casing 29 is detachably secured to a torque arm 36 having a port 37 through which the pump shaft 28 freely extends downwardly into the hub bore 32 which is dimensioned to receive it with a slidable connection between them, either a splined or key and keyway connection, a splined connection being shown in FIG. 3. The pump shaft 28 is locked to the hub 30 by a set screw 38 so that the fly wheel 13 is the support to which the weight of the pump 17 is transmitted with the function of the torque arm 36 that of pump stabilizing and opposing torque. To that end, the arm 36 is of sufficient length to extend beyond the periphery of the fly wheel 13 and over some part of the engine that serves as or can be easily converted into a seat 39 and provided with threaded bores 40 to enable the base of a resilient mount 41, shown as of an elastomeric type, to be secured thereto by screws 42. The mount 41 has threaded sockets 43 to enable the arm 36 to be secured thereto by screws 44 with the arm 36 held above the hub 30, in the described embodiment, the spacing effected by the height of the mount 41. With the pump 17 thus mounted, the casing 11 may be cut to accommodate it and a cap 45 that is provided fits over the pump 17 and is sealed to the casing 11.

In the embodiment of the invention illustrated by FIGS. 4–6, the fly wheel 46 and the upper end of the crankshaft 47 of the engine 48 are both used as the support for the pump 49.

The coupling of the attachment includes a flanged driving member 50 having a bore or chamber 51 extending vertically therethrough. The drive member 50 is clamped to the fly wheel 46 by screws 51. A driven member 52 is keyed to the end of the shaft 53 of the pump 49 and is also locked thereto by a set screw 54 accessible through a port 55 in the driving member 50.

The driven member 52 is a free fit within the chamber 51 so that it could rotate therein with a predetermined clearance and it has a series of lengthwise, circumferentially spaced channels 56 extending upwardly from its chamber entering end but terminating short of its other end to provide stops 57. The chamber 51 also has a series of channels 58, one for each of the channels 56 and spaced and arranged to be in radial alignment therewith and to define therewith a passageway. The channels 58 desirably terminate adjacent the chamber entering or bottom end of the driven member 51 to provide stops 59. A series of elastomeric splines 60 are provided, one for each of the passageways and dimensioned to extend the full length thereof and be fit therein without any material compression but having characteristics such that they provide a compressible driving connection between the drive and driven members capable of withstanding a predetermined maximum torque and also sufficiently compressible to enable the coupling to accommodate misaligning forces and cushion shocks.

The upper end of the crankshaft 47 has an axial seat 61 for a ball 62 and the lower end of the driven member 52 has a recess 63 for a seat 64 fitting the upper portion of the ball 62 so that the weight of the pump 49 is supported directly by the crankshaft 47.

The pump 49 is bolted to a holder 65 having oppositely disposed, depending flanges 66. Three torque opposing stabilizing arms 67 are provided and each has a bolt-receiving eye 68 threaded on each end. Two of the arms 67 are bolted at one end to one flange 66 adjacent the ends thereof and have their other ends bolted to a bracket 69 fixed on the engine 48 at one side of the fly wheel 46, the eyes 68 at the last named arm ends provided with elastomeric linings 70. The other arm 67 has one end bolted to the other flange 66 and its other end similarly attached to a bracket 71 fixed on the engine 48 on the opposite side of the fly wheel 46 with the eye 68 at the last named arm end also having an elastomeric lining 70.

The casing of the outboard motor of FIG. 1 has its upper portion 72 cut away and provided with a cap 73 dimensioned to accommodate the attached pump 49.

The elastomeric splines are desirably in accordance with the teachings of our co-pending application entitled "Flexible Couplings".

We claim:

1. An attachment for securing a drive shaft of a hydraulic pump to an outboard motor having a vertical crankshaft and a fly wheel secured to the upper end thereof by a nut threaded on the crankshaft, said attachment including a coupling attachable to said fly wheel and to said drive shaft then to hold said shaft vertical with the weight of the pump transmitted to the crankshaft, and resiliently yieldable torque opposing means connected to the pump and to said motor laterally of the fly wheel, said torque means laterally yieldable to accommodate misalignment forces.

2. The attachment of claim 1 in which the coupling is a hub bolted to the fly wheel, the pump shaft is locked to the hub against axial movement relative thereto.

3. The attachment of claim 1 in which the coupling includes a driving member bolted to the fly wheel, a driven member secured to the pump shaft and extending slidably through the driving members, a driving connection between said members, and a supporting ball joint between said driven member and the upper end of the crankshaft transmitting the weight of the pump thereto.

4. The attachment of claim 2 in which the fly wheel has an axial, cylindrical seat in which the nut is located and which has a series of tapped holes spaced from the fly wheel axis, the hub has a cylindrical portion dimensioned to be a precision fit in said seat and provided with a series of bores, one for each tapped hole and vertically alignable therewith, and a bolt, one for each tapped hole and dimensioned to extend downwardly through said bores and to be threaded therein.

5. The attachment of claim 4 in which the bores are so dimensioned that the bolts are substantially undersized relative thereto.

6. The attachment of claim 4 in which the cylindrical portion is a boss.

7. The attachment of claim 3 in which the ball joint includes an axial seat in the upper end of the crankshaft, the driven member has an axial seat in its lower end and a ball is confined between said seats.

8. The attachment of claim 3 in which the driving connection is also shock absorbing.

9. The attachment of claim 8 in which the driving connection is capable of withstanding a predetermined maximum torque and failing if that maximum torque is exceeded.

10. The attachment of claim 3 and a holder to which the pump is attached and the torque opposing means includes a series of at least three arms attached to said holder and spaced to provide stabilization when attached to the motor, each arm including at least at one end a bolt-receiving eye and an elastomeric liner within the eye.

11. An outboard motor including a vertical crankshaft, a fly wheel on the upper end thereof, and a nut threaded on said crankshaft end and securing said fly wheel, a hydraulic pump including a drive shaft, a coupling secured to said pump shaft and to said fly wheel with said pump shaft vertical and transferring the weight of the pump to said crankshaft, and resiliently yieldable torque opposing means connected to the pump and to said motor laterally of the fly wheel, said torque means laterally yieldable to accommodate misalignment forces.

12. The outboard motor of claim 1 in which the torque opposing means includes a series of arms connected to said motor in positions spaced from each other to effect the stabilization of the pump.

13. The outboard motor of claim 1 in which the coupling is flexible and includes a driving member secured to the fly wheel, a driven member connected to the pump shaft and extending through the first member, a ball held captive between the lower end of the driven member and the upper end of the crankshaft, and a driving connection between the driving and driven members accommodating both shock and misalignment forces.

* * * * *